(12) United States Patent
Samant (10) Patent No.: US 9,723,088 B2
(45) Date of Patent: Aug. 1, 2017

(54) FACILITATING USERS TO SHARE PHYSICAL LOCATIONS

(71) Applicant: Hrishikesh Samant, Malvern, PA (US)

(72) Inventor: Hrishikesh Samant, Malvern, PA (US)

( * ) Notice: Subject to any disclaimer, the term of this patent is extended or adjusted under 35 U.S.C. 154(b) by 210 days.

(21) Appl. No.: 14/680,063

(22) Filed: Apr. 6, 2015

(65) Prior Publication Data

US 2016/0294957 A1   Oct. 6, 2016

(51) Int. Cl.
*H04L 29/08* (2006.01)
*G01C 21/00* (2006.01)
*H04W 4/02* (2009.01)

(52) U.S. Cl.
CPC .......... *H04L 67/18* (2013.01); *H04L 67/1097* (2013.01); *H04W 4/02* (2013.01); *H04W 4/028* (2013.01)

(58) Field of Classification Search
CPC ........................... H04L 67/1097; H04W 4/028
USPC ......... 709/204, 217, 226, 231; 455/3.01, 18, 455/456.1, 456.2
See application file for complete search history.

(56) References Cited

U.S. PATENT DOCUMENTS 9,417,313 B2 * 8/2016 Smith ................. H04L 65/1006
2005/0250516 A1 * 11/2005 Shim ....................... H04W 8/18
455/456.1

OTHER PUBLICATIONS

"Transient Crowd Discovery on the Real-Time Social Web"—Kamath et al, Texas A&M University, Feb. 2011 http://faculty.cse.tamu.edu/caverlee/pubs/kamath11wsdm.pdf.*
www.google.com/maps.
www.mapquest.com.
www.zip.pr.
www.mygeoposition.com.

* cited by examiner

*Primary Examiner* — Randy Scott
(74) *Attorney, Agent, or Firm* — Syam Prasad Anand; Mainline Intellectual Property LLC (57) ABSTRACT

According to an aspect, a server receives first and second transient (changing with time) locations of an entity, the first transient location being associated with a time instance until which the entity is physically present at the first transient location. The server accordingly provides the first transient location as the physical location of the entity prior to the time instance, and the second transient location as the physical location after the time instance. According to another aspect, a client device identifies that a search text (received from a user) is directed to searching for physical locations in view of the search text including an affix. The client device then parses the search text to determine an identifier, sends a location request containing the identifier, receives a response containing a transient location associated with the identifier, and then provides the transient location to the user as the response to the search.

7 Claims, 8 Drawing Sheets

SPL - Share/Search Physical Locations

Search Tag: &www.Johns        [Go]

Matching Results (2)

&www.JohnsFoodTruck.com
NYC, intersection of 34th street and 9th Avenue, look for truck with a big red sign that says JFT. *From: 1-Jan-2015 To: 31-Jan-2015*

&www.JohnsMetalWorks.com
501-039 Church Road, Phoenixville, Chester County, Pennsylvania, USA
*From: 1-Jan-2010 To: 1-Jan-2030*

[Locate] [New Tag] [Addresses] [...]

SPL - Share/Search Physical Locations

Tag: &www.JohnsFoodTruck.com
Description: John's big blue food truck

Options

Map
Address
Start Date: 1-Jan-2015
End/Expiry Date: 31-Jan-2015

[Save And Exit]

[Locate] [New Tag] [Addresses] [...]

SPL - Share/Search Physical Locations

Search Tag: &www.Johns    [Go]

Matching Results (2)

&www.JohnsFoodTruck.com
NYC, intersection of 3rd Ave and 9th street, look for truck with a big red sign that says JFT.
*From: 1-Feb-2015 To: 25-Feb-2015*

&www.JohnsMetalWorks.com
501-039 Church Road, Phoenixville, Chester County, Pennsylvania, USA
*From: 1-Jan-2010 To: 1-Jan-2030*

| Locate | New Tag | Addresses | ... |

&YMCA

Web (1021)
YMCA Bangalore http://www.ymcabir.net/
The YMCA will celebrate, preserve, enhance and sustain creation in which ...
YMCA India http://www.ymcaindia.org/
Foundation Stone of YMCA Sports Complex Faridabad. The sprawling campus of the National...

Locations (1)
&YMCAExtonPicnic2015 ~49
Enter Valley Forge Park using them main entrance, drive 1.5 miles east. Picnic will be in the ... *From: 30-Mar-2015 To: 31-Mar-2015*

Images (2054)
Image1
Image2
Image3

Videos (27)
Video1
Video2
Video3

48

|  | Tag | LocationInfo | StartDate | EndDate |
|---|---|---|---|---|
| 54a | &6105551212 | 3 Broad Street, Philadelphia, 19001, US | 1-Jan-2014 | 31-Dec-2020 |
| 54b | &JohnOliversBoat | 74.123 North, 43.2345 West | 5-Apr-2015 | 6-Apr-2015 |
| 54c | &JohnOliversBoat | 78.234 North and 45.341 West | 6-Apr-2015 | 8-Apr-2015 |
| 54d | &www.JohnsFoodTruck.com | NYC, intersection of 34th street and 9th Avenue, look for truck with a big red sign that says JFT. | 1-Jan-2015 | 31-Jan-2015 |
| 54e | &www.JohnsFoodTruck.com | NYC, intersection of 3rd Ave and 9th street, look for truck with a big red sign that says JFT. | 1-Feb-2015 | 25-Feb-2015 |
| 54f | &YMCAExtonPicnic2015 | Enter Valley Forge Park using them main entrance, drive 1.5 miles east. Picnic will be in the children's area to the right of the visitor center. | 30-Mar-2015 | 31-Mar-2015 |
| 54g | &QWR291234ASD.67.IO | 32.1234 North, 45.7895 East | 1-Jan-2015 | 20-Jan-2015 |
| 54h | &DrMathewSmith | 500, 3rd Avenue, New York, NY | 1-Jun-2015 | 31-Dec-2015 |
| 54i | &5232368752375 | Acme Factory, 2nd Floore, PA 19344. Check 2nd shelf in room 203B | 15-Jun-2015 | 20-Jun-2015 |

FACILITATING USERS TO SHARE PHYSICAL LOCATIONS

BACKGROUND OF THE DISCLOSURE

Technical Field

The present disclosure relates to application systems and more specifically to facilitating users to share physical locations.

Related Art

A physical location of an entity (e.g., person, thing, etc.) refers to a real world location where the entity is physically present. The physical location of an entity present on Earth may be precisely specified using geographical co-ordinates (e.g. by a combination of latitude, longitude and elevation), though often more convenient formats such as a postal address, directions from a well-known location, etc. are used when the context is unambiguous.

There is often a need for users to share physical locations. For example, a first user may wish to have a physical (face to face) meeting with a second user, and accordingly the first user may need to share his/her physical location with the second user. As another example, an event manager conducting an event may need to share the physical location (e.g., meeting hall, stadium, etc.) where the event is being conducted to facilitate participants of the event to reach the location.

There are several challenges to sharing physical locations. One challenge is that the physical location of an entity may change over time. For example, a food truck may be operative at a first location during weekdays and at a second location during weekends. During specific days, for example, during a sporting event, the food truck may be operative at a third location. The manager/owner of the food truck may wish to share the different locations (at corresponding time instances) to customers of the food truck.

Several aspects of the present disclosure facilitate users to share physical locations, in particular, the different (physical) locations of the same entity noted above.

SUMMARY OF THE DISCLOSURE

An aspect of the present disclosure facilitates users to share physical locations. In one embodiment, a server receives, from a first user, a first transient (changing with time) location and a second transient location of a first entity, the first transient location being associated with a first time instance until which the first entity is physically present at the first transient location. The server accordingly provides the first transient location as the physical location of the first entity prior to the first time instance, and the second transient location as the physical location of the first entity after the first time instance.

In one embodiment, upon receiving, from a second user, a first location request and a second location request for the first entity, the server determines that the first location request is received prior to the first time instance and the second location request is received after the first time instance. The server accordingly sends the first transient location as a response to the first location request, and the second transient location as a response to the second location request.

Thus, a (first) user is facilitated to share the transient locations of the first entity with other users (such as the second user noted above). It may be appreciated that each of the first and second transient locations may be specified as one of a geographical coordinates of the first entity, a postal address of the first entity, a set of directions to reach the first entity from a well-known location, while the first time instance may be specified as an expiry date associated with the first transient location.

According to another aspect of the present disclosure, a first identifier of the first entity is received along with the first and second transient locations (noted above). Accordingly, the each of the first and the second location requests received from a second user contains the first identifier to identify the first entity.

According to one more aspect of the present disclosure, the first and second location requests are received in response to the second user searching (at different time instances) for a text containing an affix and the first identifier (of the first entity noted above). In one embodiment, the affix is a pre-defined text that is prefixed to the first identifier, with the first identifier being a well-known identifier of the first entity such as a phone number, an email address, a URL (uniform resource locator) associated with the first entity.

According to yet another aspect of the present disclosure, a mapping data containing records is maintained, with each record specifying an identifier of a corresponding entity, a transient location of the corresponding entity, and period during which the corresponding entity is physically present at the transient location. In response to receiving a location request containing an identifier, the mapping data is inspected to identify a record whose identifier matches the received identifier. It is then determined whether the location request is received in or outside the period specified in the identified record. A response is sent to the location request, with the response containing the transient location specified in the identified record if it is determined that the location request is received in the period (specified in the identified record). Otherwise, the response indicates that a physical location (corresponding to the received identifier) is not available.

According to an aspect of the present disclosure, a client device receives a search text from a user, and identifies that the search text is directed to searching for physical locations in view of the search text including an affix. In one embodiment, the affix is a pre-defined text that forms a prefix in the search text. The client device accordingly sends a location request containing the search text to a server. Upon receiving from the server, a response to the location request containing a transient location associated with the search text, the client device provides the received transient location to the user. In the scenario that the search text is a partial text, the client device receives a list of transient locations matching the partial text. The client device may then provide the list of transient locations to the user.

Thus, a user is facilitated to search for physical locations specified/shared by other users using a client device. In one embodiment, client device parses the search text to determine an identifier specified in the search text. When the affix is a pre-defined text, the client device determines the search text excluding the pre-defined text as being the identifier. The determined identifier is then sent as part of the location request, with the response then containing the transient location associated with the sent identifier.

Several aspects of the disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EMBODIMENTS OF THE DISCLOSURE

1. Example Environment

Figure 1:
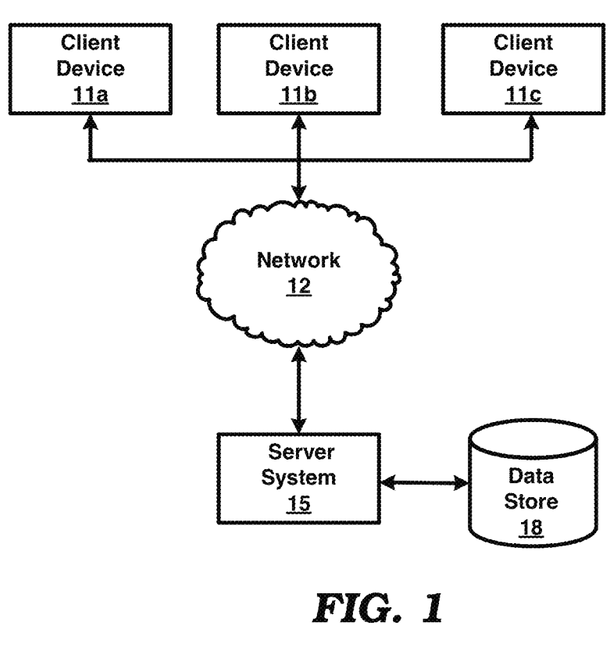
FIG. 1 is a block diagram illustrating an example environment in which various aspects of the present disclosure can be implemented.

FIG. 1 is a block diagram illustrating an example environment in which various aspects of the present disclosure can be implemented. The block diagram is shown containing client devices 11a-11c, network 12, server system 15, and data store 18. Merely for illustration, only representative number/type of systems is shown in FIG. 1. Many computing systems often contain many more systems, both in number and type, depending on the purpose for which the computing system is designed. Each system/device of FIG. 1 is described below in further detail.

Network 12 provides connectivity between client devices 11a-11c, and server system 15. Network 12 may represent Wireless/LAN networks implemented using protocols such as Transport Control Protocol/Internet Protocol (TCP/IP), or circuit switched network implemented using protocols such as GSM, CDMA, etc. as is well known in the relevant arts.

In general, network 12 provides transport of packets, with each packet containing a source address (as assigned to the specific system from which the packet originates) and a destination address, equaling the specific address assigned to the specific system to which a packet is destined/targeted. The packets would generally contain the requests and responses between the client devices 11a-11c, and server system 15 as described below.

Data store 18 represents a non-volatile storage, facilitating storage and retrieval of a collection of data (such as entity identifiers, transient locations, etc.) by server system 15. In one embodiment, data store 18 is implemented using relational database technologies and provides storage and retrieval of data using structured queries such as SQL (Structured Query Language), as is well known in the relevant arts. Alternatively, data store 18 may be implemented as a file server and store data in the form of one or more files organized in the form of a hierarchy of directories, as is well known in the relevant arts.

Each of client devices 11a-11c represents a system such as a personal computer, workstation, mobile phones (e.g. iPhone available from Apple Corporation), tablets, portable devices (also referred to as "smart" devices") that operate with a generic operating system such as Android operating system available from Google Corporation, etc., used by users to send (client) requests to server system 15. The client requests may be generated using appropriate user interfaces. In general, a client device enables a user to send client requests for performing desired tasks to server system 15 and to receive corresponding responses containing the results of performance of the requested tasks. Each of client devices 11a-11c may include various hardware (and corresponding software) sensors such as GPS (global positioning system), camera, microphone, accelerometers, etc. that may be used for forming some of the client requests.

Server system 15 represents a system, such as a web and/or application server, executing various software applications designed to perform tasks requested by users using client devices 11a-11c. The applications may perform the tasks using data maintained internal to server system 15, external data (e.g. maintained in data store 18) or other data (e.g. received as part of the client request). The results of performance of the tasks may then be sent as corresponding responses to the requesting client device. Furthermore, server system 15 may maintain some of the received information (such as data contained in the requests/responses) in data store 18.

It may be appreciated that users using client devices 11a-11c may wish to share physical locations with other users. Server system 15, provided according to several aspects of the present disclosure, facilitates users to share physical locations, as described below with examples.

2. Sharing Physical Locations

Figure 2:
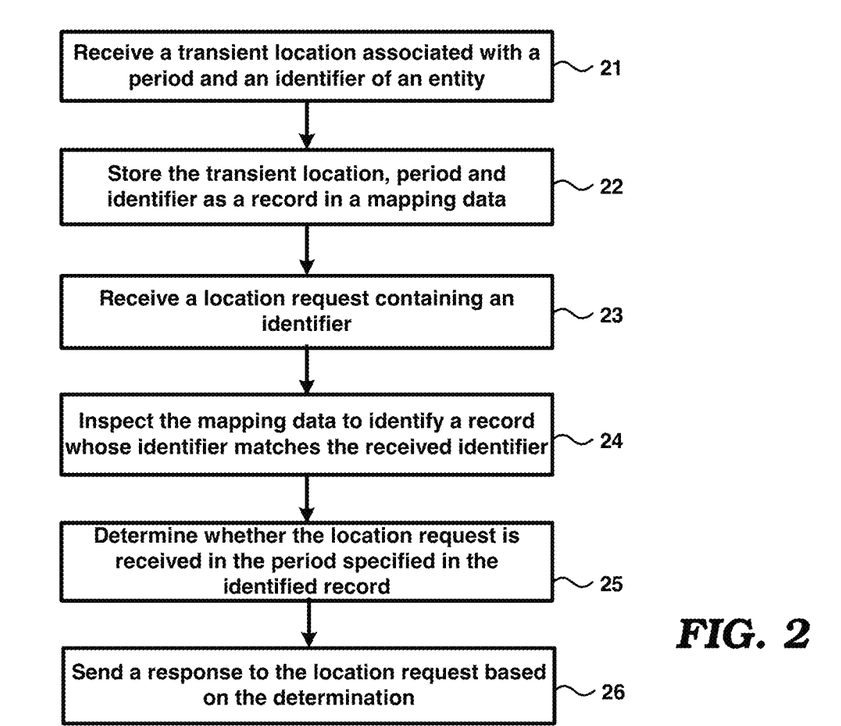
FIG. 2 is a flow chart illustrating the manner in which a user is facilitated to share physical locations according to an aspect of the present disclosure.

FIG. 2 is a flow chart illustrating the manner in which a user is facilitated to share physical locations according to an aspect of the present disclosure. The flowchart is described with respect to FIG. 1, in particular server system 15, merely for illustration. However, various features can be implemented in other systems and/or other environments also without departing from the scope and spirit of various aspects of the present disclosure, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present disclosure.

In step 21, server system 15 receives a (share request specifying a) transient location associated with a period and an identifier of an entity. The share request may be received from a user using one of client devices 11a-11c. The share request indicates that the entity is physically present at the transient location during the period, though the location is likely to change with time (as indicated by the term "transient"). The transient location may be specified as a geographical coordinates of the entity, a postal address of the entity or a set of directions to reach the entity from a well-known location.

It may be appreciated that the period may be specified explicitly, for example, as start and end time instances (including date and/or time). Alternatively, only an end/expiry time instance may be specified, with the start time instance implied by the previous expiry time instance. The identifier of the entity may be specified in any convenient manner. In general, the identifier is in the form of a text/string containing alphanumeric and other allowed special/symbol characters. In one embodiment, the identifier is a (previously) well-known identifier of the entity such as a phone number, an email address, a URL (uniform resource locator) associated with the entity.

In step 22, server system 15 stores the transient location, period and identifier as a record in a mapping data. The mapping data may be maintained in data store 18, and accordingly server system 15 may generate and execute queries to cause the record to be stored in mapping data. A new record may be created or an existing record may be updated based on whether the identifier and period specified in the share request is new or existing respectively.

It may be appreciated that steps 21 and 22 may be performed several times in response to receiving share requests from different users using client devices 11a-11c. Accordingly, the mapping data contains multiple records, with each record specifying an identifier of a corresponding entity, a transient location of the corresponding entity, and a period during which the corresponding entity is physically present at the transient location.

In step 23, server system 15 receives a location request containing an identifier. The location request may be received from a user using one of client devices 11a-11c. The user sending the location request may be the same as or different from the user(s) sending the share request(s) in step 21.

In step 24, server system 15 inspects the mapping data to identify a record whose identifier matches the received identifier. The matching may be performed in a known way, for example, by string/text comparison of the record identifier(s) with the received identifier, as is well known in the relevant arts. In general, the string/text comparison is performed between the received identifier with the identifier in each of the records contained in mapping data until a match is identified. In the scenario that no record matches, a response may be sent (to the requesting client device) indicating that the identifier does not match any existing record. The description is continued assuming that a record whose identifier matches the received identifier is identified in step 24.

In step 25, server system 15 determines whether the location request is received in the period specified in the identified record (of step 24). A location request received at a specific time instance (date and/or time) is deemed to be "in" a period only if the specific time instance is greater than or equal to the start time instance of the period and less than or equal to the end time instance of the period, and deemed to be "outside" the period otherwise (that is when the specific time instance is less than the start time instance or greater than the end time instance).

In other words, server system 15 determines whether the record is relevant to time instance (date and/or time) at which the location request is received. It may be appreciated that multiple records (having the same identifier but with different periods) may be identified in step 24, and accordingly the determination may entail checking whether the specific time instance at which the location request is received is "in" any one of the periods specified in the identified multiple records.

In step 26, server system 15 sends a response to the location request based on the determination of step 25. In the scenario that the location request is determined to be received in the period specified in an identified record, the response contains the transient location specified in the identified record. Alternatively, when the location request is outside the period, the response indicates that a physical location is not available for the identifier specified in the location request.

It may be appreciated that in a scenario that a first and a second transient locations are received for an entity with the first transient location associated with a time instance (until which the entity is physically present at the first transient location), steps 25 and 26 together operate to provide the first transient location as the physical location of the entity prior to the time instance, and the second transient location as the physical location of the entity after the time instance.

Thus, users using client devices 11a-11c are facilitated to share physical locations with other users. A user may thereafter search for the shared physical locations, as described below with examples.

3. Searching for Physical Locations

Figure 3:
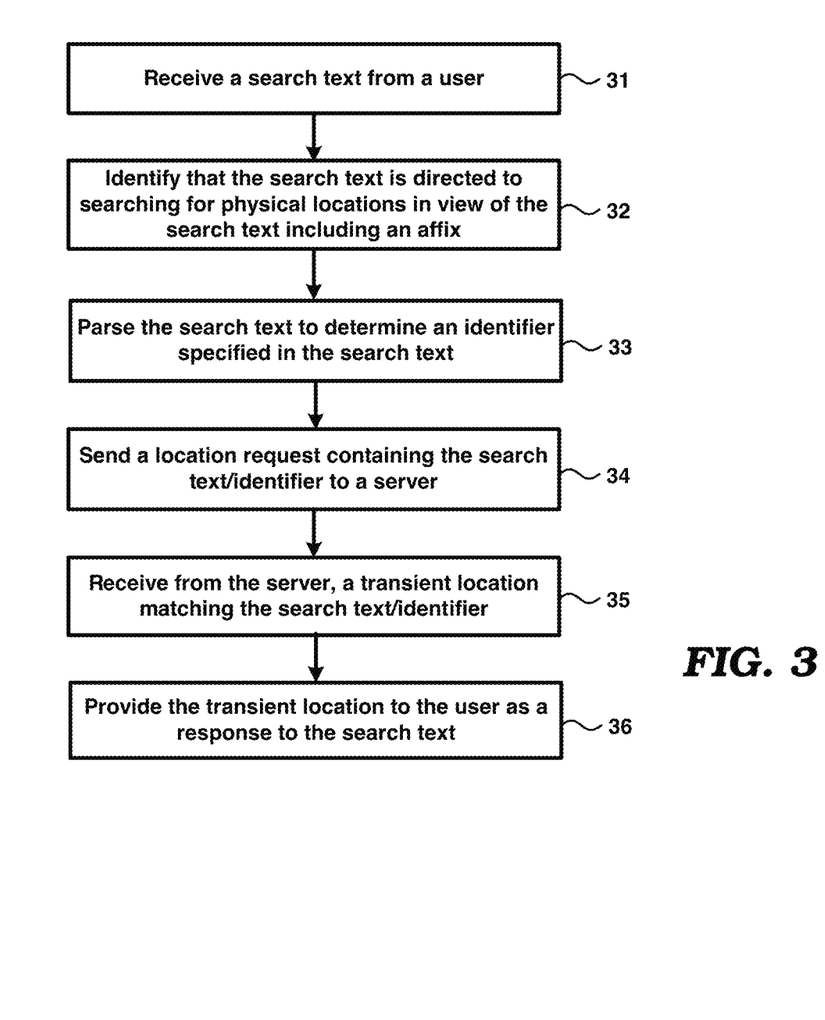
FIG. 3 is a flow chart illustrating the manner in which a user is facilitated to search for physical locations (shared by other users) according to an aspect of the present disclosure.

FIG. 3 is a flow chart illustrating the manner in which a user is facilitated to search for physical locations (shared by other users) according to an aspect of the present disclosure. The flowchart is described with respect to FIG. 1, in particular client device 11a, merely for illustration. However, various features can be implemented in other systems (such as client devices 11b-11c) and/or other environments also without departing from the scope and spirit of various aspects of the present disclosure, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present disclosure.

In step 31, client device 11a receives a search text from a user. The search text may be entered by the user in a user interface provided on client device 11a. In one embodiment, the search text is received from a third party search engine such as Google™ search, Bing™ search.

In step 32, client device 11a identifies that the search text is directed to searching for physical locations in view of the search text including an affix. Such identification may be performed using string/text functions such as substring, as will be apparent to one skilled in the relevant arts. In one embodiment, the affix is a pre-defined text that forms a prefix in the search text, and accordingly client device 11a may check whether the search text received in step 31 starts with the pre-defined text.

It may be appreciated that in the scenario that the search text does not include the affix, no further action is performed. The below described steps of parsing (optional), sending, receiving (from server) and providing are performed only if client device 11a identifies that the search text is directed to searching for physical locations. The description is continued assuming that the search text is identified as being directed to searching for physical locations.

In step 33, client device 11a parses the search text to determine an identifier specified in the search text. It should be noted that step 33 is an optional step, and that steps 34-36 may be performed with the search text used in place of the identifier. In the embodiment where the affix is a pre-defined text, client device 11a determines that the search text excluding the pre-defined text as the identifier specified in the search text.

In step 34, client device 11a sends a location request containing the search text/identifier to server system 15. The location request may be sent consistent with the requirements of server system 15, as noted above with respect to step 23 of FIG. 2.

In step 35, client device 11a receives from the server, a transient location matching the search text/identifier (sent in the location request). In one embodiment, the search text may be a partial text, and accordingly client device 11a receives in step 35, a list of transient locations matching the partial text.

In step 36, client device 11a provides the transient location (or the list of transient locations) to the user as a response to the search text. The transient location may be provided in any convenient manner. For example, the transient location may be displayed as text to the user. Alternatively, in the scenario that the transient location specifies geographical coordinates, a map may be displayed with the specified geographical coordinates marked appropriately on the map. In addition, in the scenario that the transient location is a postal address, directions to reach the postal address may also be displayed to the user.

It may be appreciated that in the scenario that the search text is received from a third party search engine, the transient location may be displayed along with other results determined by the search engine for the search text. Furthermore, when the search text is a partial text, client device 11a may provide the received list of transient locations to the user in any convenient format.

Thus, a user using a client device (such as 11a) is facilitated to search for physical locations shared by other users. In one embodiment, the client device also facilitates the user to share physical locations. Some sample user interfaces that may be provided on a client device (such as 11a-11c) for sharing (and to search for) physical locations is described below with examples.

4. Sample User Interfaces

FIGS. 4A-4F depicts sample user interfaces provided on a client device (assumed to be 11a, for illustration) in one embodiment. The portions of the user interfaces shown in FIGS. 4A-4E may be received from server system 15 in response to sending corresponding client requests from client device 11a, and thereafter displayed on a display unit associated with client device 11a. In alternative embodiments, an application (downloaded from server system 15) may be executing in client device 11a and provide similar interfaces. The portions of the user interface shown in FIG. 4F may be provided by a (third party) search engine executing in client device 11a. For conciseness, only the first occurrence of each display element is described below.

Figure 4A:
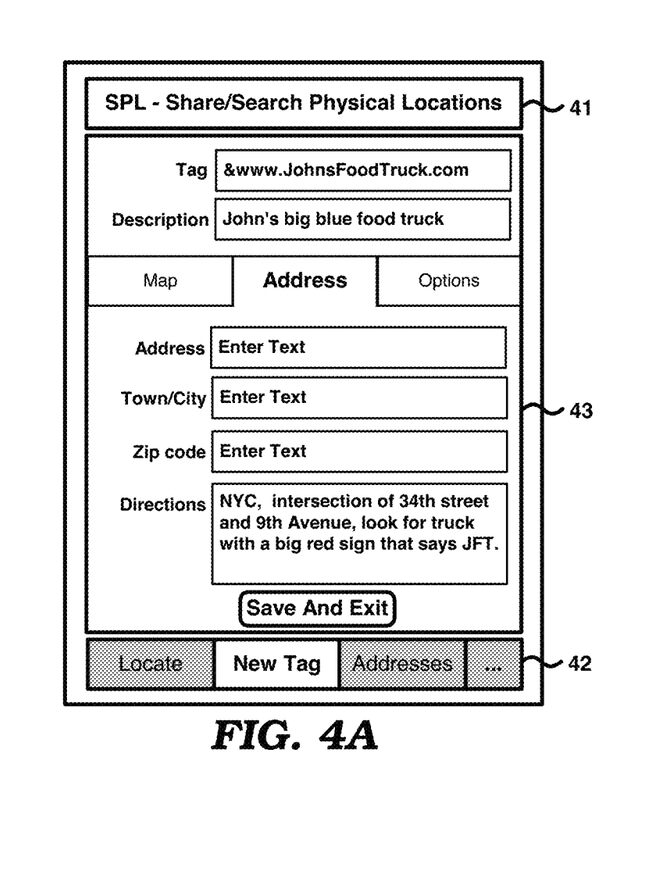
FIGS. 4A-4C illustrates the manner in which a user specifies a physical location in one embodiment.
Figure 4B:
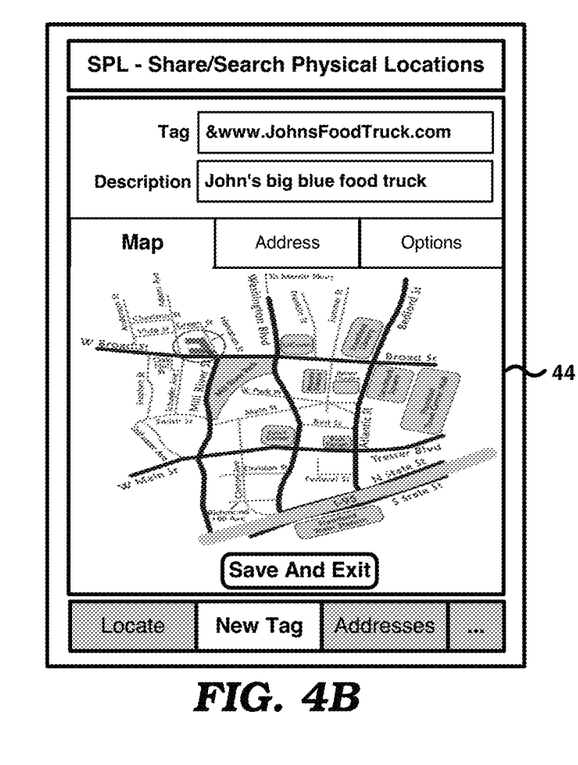
Figure 4C:
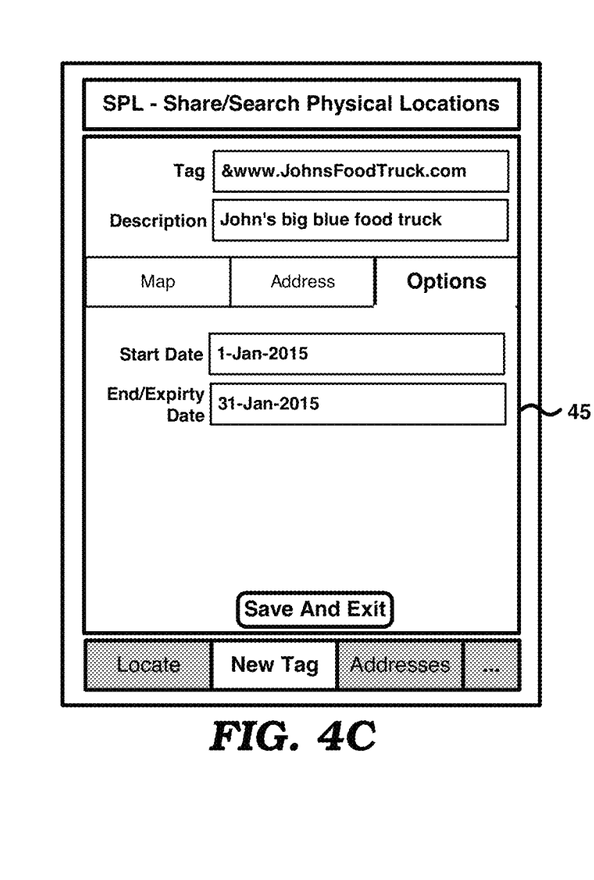

FIGS. 4A-4C illustrates the manner in which a user specifies a physical location in one embodiment. Referring to FIG. 4A, display area 41 indicates that the user is currently using an application named "SPL—Share/Search Physical Locations" for sharing/searching physical locations. Display area 42 provides various options to the user such as "Locate" (for searching physical locations), "New Tag" (for specifying new physical locations), "Addresses" (for viewing previously searched or specified physical locations), etc. Display area 42 indicates that the "New Tag" option is selected (text shown in bold in white background) indicating that the user is currently specifying (and accordingly sharing) a new physical location.

Display area 43 depicts the manner in which a user is facilitated to specify a physical location. In particular, display area 43 facilitates the user to specify a tag ("&www-.JohnsFoodTruck.com") for the entity of interest, a description of the entity of interest, and then specify the physical location of the entity. It may be appreciated that the tag contains a pre-defined text ("&") prefixed to the identifier ("www.JohnsFoodTruck.com"). The pre-defined text facilitates any already well-known identifier such as a phone number, an email address, a URL (universal resource locator), an international number for barcode, etc. to be used as the identifier. Alternatively, the identifiers may be a string/text containing a random set of characters (alphanumeric and allowed special/symbol characters).

Referring again to FIG. 4A, display area 43 is also shown containing three tabs—"Map", "Address" and "Options", with table "Address" shown as selected. Accordingly, display area 43 is shown displaying various text fields for specifying the address associated with the tag/identifier. Text fields such as Address, Town/City, Zip Code facilitate the user to specify a postal address as the physical location, while the text field "Directions" facilitates the user to specify directions (from a well-known location) as the physical location of the entity of interest.

Referring to FIG. 4B, display area 44 depicts the manner in which a user is facilitated to specify geographical coordinates as a physical location of the entity of interest. Display area 44 may be displayed in response to the user selecting the tab "Map" in display area 43. Display area 44 is shown displaying a map, with the user having the ability to select a point on the map, with the geographical coordinates of the selected point being determined as the physical location of the entity of interest.

Referring to FIG. 4C, display area 45 depicts the manner in which a user is facilitated to specify start and end/expiry dates for the physical location (and accordingly make the physical location into a transient location). Display area 45 may be displayed in response to the user selecting the tab "Options" in display area 43. Text fields "Start Date" and "End/Expiry Date" in display area 45 facilitates the user to specify start and end dates respectively. Though not shown, it may be appreciated that in alternative embodiments, additional/appropriate fields may be provided for specifying both dates and times.

After specifying the desired information, the user may select/click on "Save and Exit" button to cause the information specified in FIG. 4A-4C to be sent as a share request to server system 15. Server system 15, in response to the share request, creates/updates a record in mapping data according to the information specified in FIG. 4A-4C. For example, in response to receiving a share request containing the information shown in FIG. 4A-4C, server system 15 may create a new record with the identifier as "www.JohnsFoodTruck.com", the physical location as "NYC, intersection of 34th street and 9th Avenue, look for truck with a big red sign that says JFT." (as specified in the "Directions" text field in display area 43), and period as [1 Jan. 2015, 31 Jan. 15] (as specified in display area 45).

Thus, by using the interfaces of FIG. 4A-4C, users are facilitates to share the physical locations of desired entities of interest. The manner in which a user may thereafter search for physical locations is described below with examples.

Figure 4D:
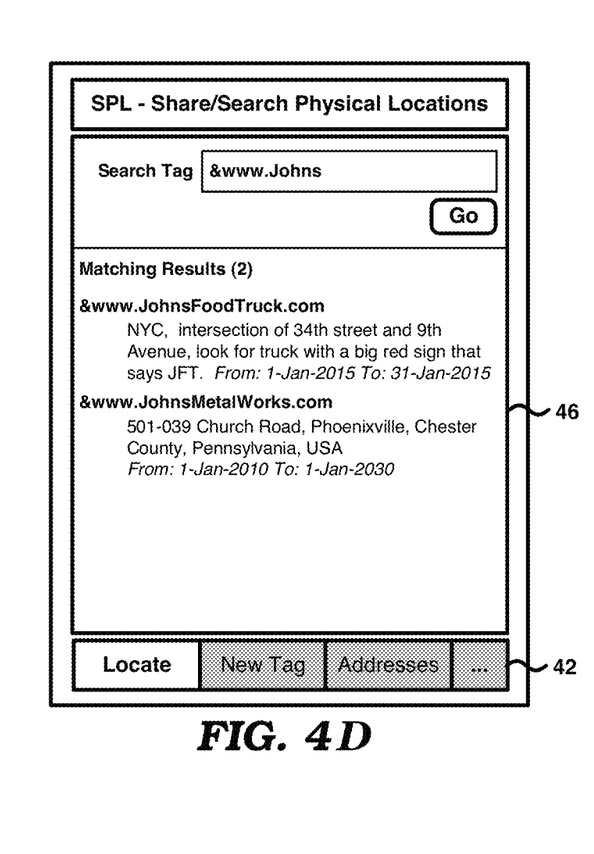
FIGS. 4D-4F illustrates the manner in which a user searches for physical locations in one embodiment.
Figure 4E:
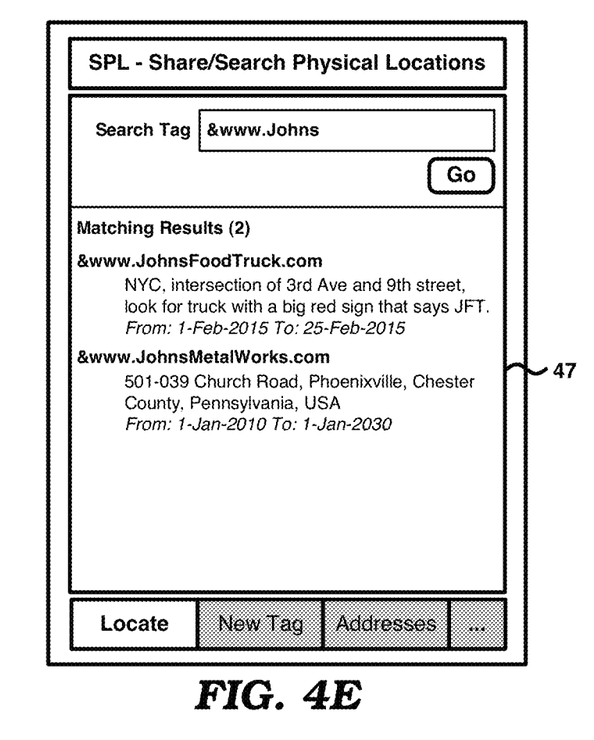
Figure 4F:
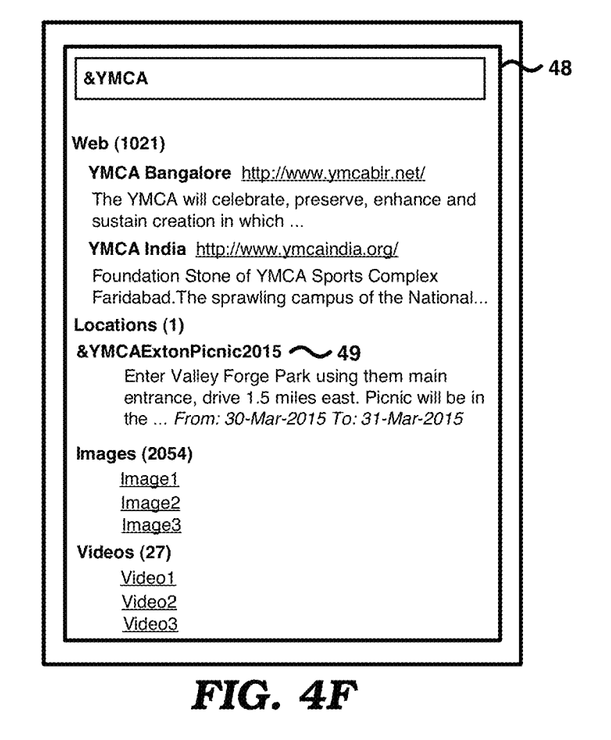

FIGS. 4D-4F illustrates the manner in which a user specifies a physical location in one embodiment. Referring to FIG. 4D, display area 42 indicates that the "Locate" option is selected (text shown in bold in white background) indicating that the user is currently searching for physical locations. Display area 46 is shown containing a "Search Tag" field, wherein the user is enabled to specify a search text (such as "&www.John") for searching physical locations. It may be observed that the search text is shown containing the pre-defined text "&" as the prefix, and as such causes client device 11a to identify that the search text is directed to searching for physical locations.

Accordingly, in response to the user clicking/selecting the "Go" button in display area 46, client device 11a sends a location request containing the search text "&www Johns" to server system 15. For illustration, it is assumed that the location request is received by server system 15 on 15 Jan. 2015.

It may be observed that the search text is a partial text and accordingly server system 15 sends a response containing a list of transient/physical locations associated with the partial text. In particular, display area 46 indicates that there are two physical locations that are associated with the search text "&www Johns" as on 15 Jan. 2015 (the time instance at which the location request was received). Each of the results indicates a corresponding identifier, physical location and period as stored in the record (having the identifier) matching the search text.

In one embodiment, client device 11a, in response to the user selecting "Go" button, first parses the search text to determine the identifier specified in the search text. The parsing may determine the search text "&www Johns" excluding the pre-defined text "&" as being the identifier, that is, "www.Johns" Client device 11a may then send the identifier as part of the location request and receive transient locations matching the sent identifier.

Referring to FIG. 4E, display area 47 depicts the results of performance of a search with search text "&www.Johns" on 15 Feb. 2015 (assumed for illustration). Though the search text is the same in both of display area 46 and 47, it may be observed that the physical locations (and also the corresponding periods) are shown to be different for the same tag/identifier "&www.JohnsFoodTruck.com", in view of the location requests being received by server system 15 on 15 Jan. 2015 and 15 Feb. 2015 respectively. It may be further observed that the periods shown for the tag "&www-.JohnsFoodTruck.com" in display area 46 and 47 respectively indicate that the corresponding physical location has been identified based on the time instance/date of receipt of the location request.

Though the providing of different physical locations associated with the same tag/identifier has been described above with respect to requests received on 15 Jan. 2015 and 15 Feb. 2015, it should be appreciated that for all location requests that contain/match the tag/identifier "&www.JohnsFoodTruck.com" received from 1 Jan. 2015 to 31 Jan. 2015, the physical location shown in display area 46 is provided, while for all location request received from 1 Feb. 2015 to 25 Feb. 2015, the physical location shown in display area 47 is provided. It may also be appreciated that the physical location associated with the tag/identifier "&www.JohnsMetalWorks.com" is shown to be the same in both of display areas 46 and 47 since both the location requests are received in the period (1 Jan. 2010 to 1 Jan. 2030) for that tag.

Referring to FIG. 4F, display area 48 indicates the manner in which searching for physical locations from third party search engines is facilitated. Display area 48 depicts a user interface provided by the search engine in which the user is shown specifying the search text "&YMCA". In response to the user typing the search text or clicking/selecting a button/option (not shown), the search engine performs a search for the user specified search text.

Client device 11a may be implemented to receive an indication of the search from the search engine. In one embodiment, the search engine is designed to be extended using plug-ins, with each plug-in providing the results of the search according to a pre-specified manner. In such a design, the aspects of the present disclosure may be implemented as a plug-in providing the result of the search of physical locations. In alternative embodiments, the features of client device 11a may be implemented consistent with the implementation of the search engine, as will be apparent to one skilled in the relevant arts by reading the disclosure provided herein.

Client device 11a, in response to receiving the search text "&YMCA", first checks whether the search text contains the affix (in this example, the pre-defined text "&" as a prefix to the search text). Upon identifying that the search text contains the affix and is accordingly directed to a search for physical locations, client device 11a sends a location request containing the search text "&YMCA" to server system 15. It is assumed that the location request is received by server system 15 on 30 Mar. 2015.

Upon receiving the physical location(s) associated with the search text, client device 11a provides the transient location(s) to the search engine as a response to the search text. The search engine may thereafter display the physical location (as shown in display area 49) along with other results (such as from Web, Images, Videos, etc.) as part of display area 48. It may be again appreciated that in the scenario that a search with the same search text is performed on days outside the period 30 Mar. 2015 to 31 Mar. 2015, the client device provides the transient location(s) to the search engine.

Thus, users are facilitated to search for physical locations shared by other users. It may be appreciated that the various user interfaces noted above is based on mapping data maintained by server system 15. A sample mapping data that may be maintained by server system 15 is described below with examples.

5. Mapping Data

Figure 5:
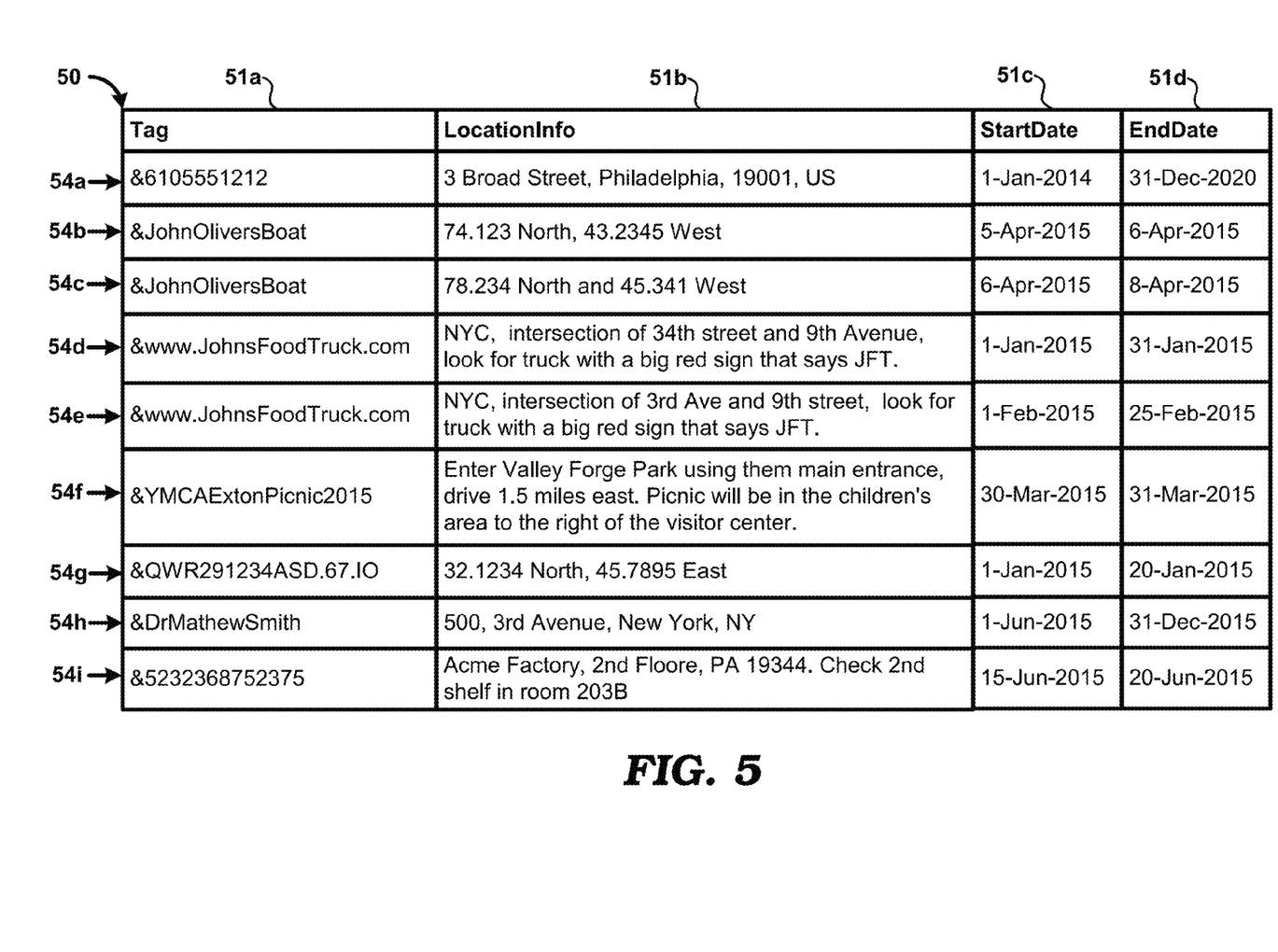
FIG. 5 depicts the manner in which mapping data is maintained in one embodiment.

FIG. 5 depicts the manner in which mapping data is maintained in one embodiment. In the following description, it is assumed that data store 18 is implemented according to relational database technologies and that the mapping data is maintained in a table (50) in a database in data store 18. Server system 15, accordingly, modifies (add, update, delete, etc.) the mapping data by sending appropriate SQL queries to data store 18.

However, in alternative embodiment, the mapping data may be stored in other formats such as eXtensible Markup Language (XML) and/or using other data structures such as files, lists, etc. as will be apparent to one skilled in the relevant arts by reading the disclosure herein.

Table 50 depicts a portion of mapping data maintained in data store 18. Only a sample set of columns and rows is shown and described below for illustration. Table 50 generally contains other columns/rows (such as "Description", etc. not shown) as suitable for the environment for which the mapping data is to be maintained, as will be apparent to one skilled in the relevant arts.

Table 50 is shown containing columns 51a-51d. Column 51a ("Tag") specifies the tag/identifier of an entity of interest, while Column 51b ("LocationInfo") specifies the physical/transient location of the entity of interest. Columns 51c-51d ("StartDate" and "EndDate") together specify the period during which the entity of interest is physically present at the transient location.

Each of the rows 51a-54i of table 50 corresponds to a record contained in the mapping data. Each row/record specifies the physical/transient location of a corresponding entity of interest. It may be observed that in rows 54a, 54h and 54i, a corresponding postal address is specified as the transient/physical location, while in rows 54b, 54c and 54g, a corresponding set of geographical coordinates (such as 32.1234 North, 45.7895 East) is specified as the physical location. In rows 54d-54f, directions to the physical location is shown specified as the location information.

It may be further observed that in rows 54a, a phone number of the entity is used as the identifier (prefixed with the pre-defined text "&" to form the tag shown there), while in rows 54d-54e, an already well-known URL of the entity is used as the identifier. In row 54i, an international article number for barcode of the entity (here, an item) is used as the identifier, while in rows 54b-54c and 54h, the name of the entity is used as the identifier. Row 54f illustrates a descriptive text being used as an identifier, while row 54h illustrates a random text being used as an identifier.

It may be appreciated that the same identifier/tag is shown specified in multiple rows/records (for example, rows 54d-54e), with the rows/records different in the periods (start and end dates) specified. Such multiple records (rows 54d-54e) form the basis for providing the different search results of display areas 46 and 47 in respective FIGS. 4D and 4E noted above. Row 54f depicts the record based on which the results of display area 48 in FIG. 4F is provided to the user.

Thus, a mapping data containing multiple records, with each record specifying an identifier of a corresponding entity, a transient location of the corresponding entity, and a period during which the corresponding entity is physically present at the transient location is maintained by server system 15.

It should be further appreciated that the above noted features can be implemented in various embodiments as a desired combination of one or more of hardware, execution modules and firmware. The description is continued with respect to one embodiment in which various features are operative when execution modules are executed.

6. Digital Processing System

Figure 6:
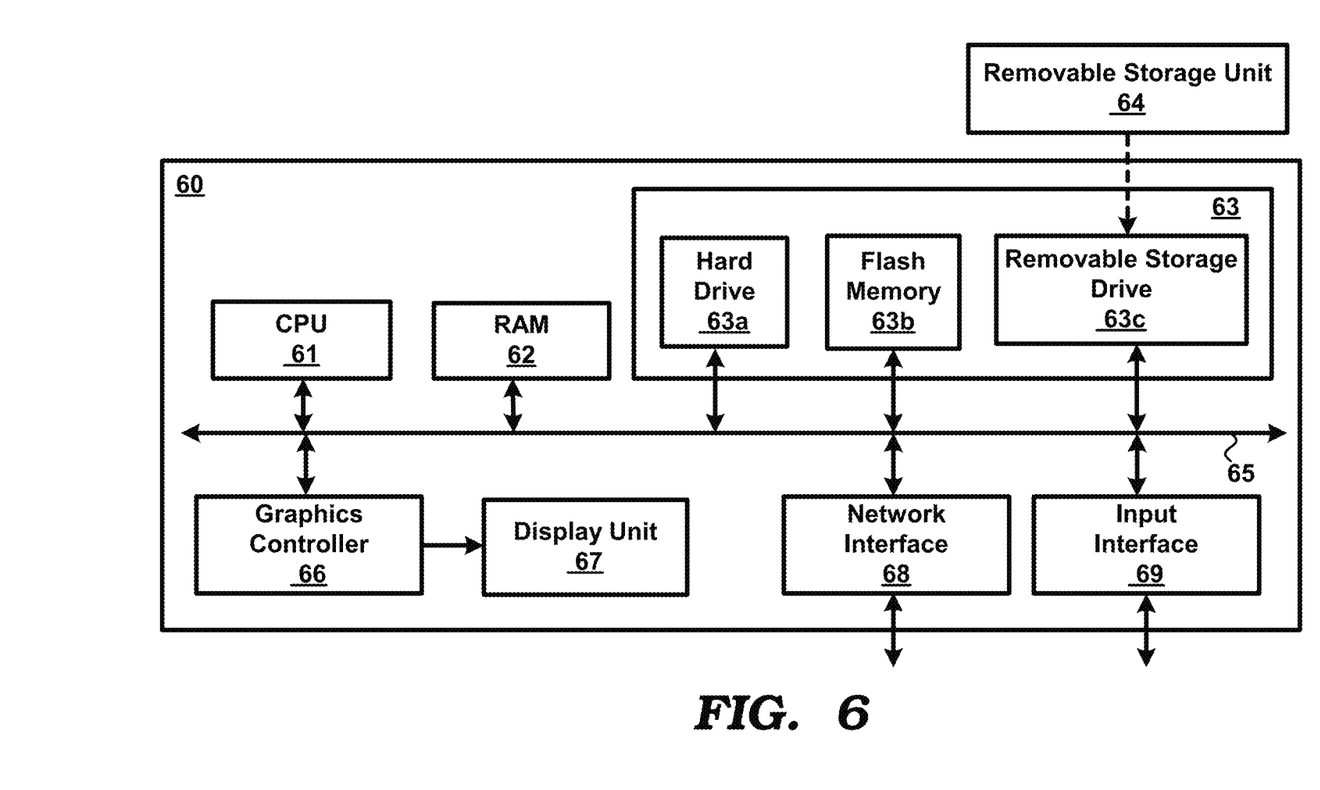
FIG. 6 is a block diagram illustrating the details of a digital processing system in which various aspects of the present disclosure are operative by execution of appropriate execution modules.

FIG. 6 is a block diagram illustrating the details of digital processing system 60 in which various aspects of the present disclosure are operative by execution of appropriate execution modules. Digital processing system 60 may correspond to one of client devices 11a-11c or to server system 15.

Digital processing system 60 may contain one or more processors (such as a central processing unit (CPU) 61), random access memory (RAM) 62, secondary memory 63, graphics controller 66, display unit 67, network interface 68, and input interface 69. All the components except display unit 67 may communicate with each other over communication path 65 which may contain several buses as is well known in the relevant arts. The components of FIG. 6 are described below in further detail.

CPU 61 may execute instructions stored in RAM 62 to provide several features of the present disclosure. CPU 61 may contain multiple processing units, with each processing unit potentially being designed for a specific task. Alternatively, CPU 61 may contain only a single general purpose processing unit. RAM 62 may receive instructions from secondary memory 63 using communication path 65.

Graphics controller 66 generates display signals (e.g., in RGB format) to display unit 67 based on data/instructions received from CPU 61. Display unit 67 contains a display screen to display the images defined by the display signals (e.g. the portions of the user interfaces in FIGS. 4A-4F provided on client devices 11a-11c). Input interface 69 may correspond to a keyboard and a pointing device (e.g., touch-pad, mouse), which enable the various inputs to be provided (such as the inputs noted above with respect to the portions of the user interfaces in FIGS. 4A-4F). Network interface 68 provides connectivity to a network (e.g., using Internet Protocol), and may be used to communicate with other connected systems (e.g. client devices 11a-11c, server system 15 of FIG. 1). Network interface 68 may provide such connectivity over a wire (in the case of TCP/IP based communication) or wirelessly (in the case of WIFI, Bluetooth™ based communication).

Secondary memory 63 may contain hard drive 63a, flash memory 63b, and removable storage drive 63c. Secondary memory 63 may store the data (e.g., portions of the mapping data of FIG. 5) and software instructions (e.g., for implementing the programming logic of the blocks shown in FIGS. 2 and 3), which enable digital processing system 60 to provide several features in accordance with the present disclosure.

Some or all of the data and instructions may be provided on removable storage unit 64, and the data and instructions may be read and provided by removable storage drive 63c to CPU 61. Floppy drive, magnetic tape drive, CD-ROM drive, DVD Drive, Flash memory, removable memory chip (PCMCIA Card, EPROM) are examples of such removable storage drive 63c.

Removable storage unit 64 may be implemented using storage format compatible with removable storage drive 63c such that removable storage drive 63c can read the data and instructions. Thus, removable storage unit 64 includes a computer readable storage medium having stored therein computer software (in the form of execution modules) and/or data. However, the computer (or machine, in general) readable storage medium can be in other forms (e.g., non-removable, random access, etc.). These "computer program products" are means for providing execution modules to digital processing system 60. CPU 61 may retrieve the software instructions (forming the execution modules), and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A non-transitory machine readable medium storing one or more sequences of instructions for causing a system to facilitate users to share physical locations, wherein execution of said one or more sequences of instructions by said one or more processors in said system causes said system to perform the actions of:

maintaining a mapping data containing a plurality of records, each record specifying an identifier of a corresponding entity, a transient location of the corresponding entity, and a period during which the corresponding entity is physically present at the transient location;

receiving a first location request containing an identifier;

inspecting said mapping data to identify a first record of said plurality of records corresponding to said first location request, said first record specifying a first identifier, a first transient location and a first period, wherein said first record is identified in response to said first identifier matching said identifier specified in said first location request;

determining whether said first location request is received in said first period or outside said first period; and sending a response to said first location request, said response containing said first transient location if said determining determines that said first location request is received in said first period, said response indicating that a physical location is not available if said determining determines that said first location request is received outside said first period.

2. The non-transitory machine readable medium of claim 1, further comprising: receiving a share request indicating a second transient location and a second period for said first identifier, wherein said first entity is physically present at said second transient location during said second period; and modifying said first record to indicate said second transient location and said second period for said first identifier, wherein said determining further determines whether said first location request is received in said second period, wherein said response contains said second transient location if said determining determines that said first location request is received in said second period.

3. The non-transitory machine readable medium of claim 2, wherein said first location request is received in response to said second user searching for a text comprising an affix and said first identifier.

4. The non-transitory machine readable medium of claim 3, wherein said affix is a pre-defined text that is prefixed to said first identifier, wherein said first identifier is a well-known identifier of said first entity.

5. The non-transitory machine readable medium of claim 4, wherein said well-known identifier is one of a phone number, an email address, a URL (uniform resource locator) associated with said first entity.

6. The non-transitory machine readable medium of claim 1, wherein said first period is specified as a start date and an end date associated with said first transient location.

7. The non-transitory machine readable medium of claim 6, wherein said first transient location comprises one of a geographical coordinates of said first entity, a postal address of said first entity, a set of directions to reach said first entity from a well-known location.

* * * * *